United States Patent
Churchill et al.

(10) Patent No.: US 7,340,021 B1
(45) Date of Patent: Mar. 4, 2008

(54) DYNAMIC PHASE ALIGNMENT AND CLOCK RECOVERY CIRCUITRY

(75) Inventors: Russell Churchill, Groton, MA (US); Vincent Figueroa, Groton, MA (US)

(73) Assignee: Altera Corporation, San Jose, CA (US)

(*) Notice: Subject to any disclaimer, the term of this patent is extended or adjusted under 35 U.S.C. 154(b) by 696 days.

(21) Appl. No.: 10/713,877

(22) Filed: Nov. 13, 2003

(51) Int. Cl.
*H04L 7/00* (2006.01)

(52) U.S. Cl. .............. 375/354; 375/326; 375/327; 375/355; 375/376

(58) Field of Classification Search ............... 375/354, 375/355, 326, 376, 327
See application file for complete search history.

(56) References Cited

U.S. PATENT DOCUMENTS

| | | | |
|---|---|---|---|
| 6,483,886 B1 | 11/2002 | Sung et al. | 375/376 |
| 6,584,163 B1* | 6/2003 | Myers et al. | 375/360 |
| 6,650,140 B2 | 11/2003 | Lee et al. | 326/39 |
| 2001/0033188 A1 | 10/2001 | Aung et al. | 327/141 |
| 2003/0052709 A1* | 3/2003 | Venkata et al. | 326/37 |
| 2004/0161067 A1* | 8/2004 | Kim et al. | 375/354 |

OTHER PUBLICATIONS

U.S. Appl. No. 10/059,014, filed Jan. 29, 2002, Lee et al.
U.S. Appl. No. 10/273,899, filed Oct. 16, 2002, Venkata et al.
U.S. Appl. No. 10/317,262, filed Dec. 10, 2002, Venkata et al.
U.S. Appl. No. 10/349,541, filed Jan. 21, 2003, Venkata et al.
U.S. Appl. No. 10/454,626, filed Jun. 3, 2003, Lui et al.
U.S. Appl. No. 10/637,982, filed Aug. 8, 2003, Venkata et al.
U.S. Appl. No. 10/668,900, filed Sep. 22, 2003, Asaduzzaman et al.

* cited by examiner

*Primary Examiner*—Ted Wang
(74) *Attorney, Agent, or Firm*—Ropes & Gray LLP (57) ABSTRACT

A dynamic phase alignment circuit is provided that aligns data signals to a phase of a forwarded clock at each channel in a multi-channel communications protocol. A forwarded clock is sent to a phase locked loop (PLL) circuit that generates multiple clock phases of the forwarded clock. The dynamic phase alignment circuit selects the optimal clock phase with which to align an input data signal for transmission to the corresponding channel. The dynamic phase alignment circuit can also be used for clock recovery.

24 Claims, 10 Drawing Sheets

DYNAMIC PHASE ALIGNMENT AND CLOCK RECOVERY CIRCUITRY

BACKGROUND OF THE INVENTION

This invention relates to phase alignment and clock recovery. More particularly, this invention relates to providing dynamic phase alignment and clock recovery circuitry.

Programmable logic resource technology is well known for its ability to allow a common hardware design (embodied in an integrated circuit) to be programmed to meet the needs of many different applications. Known examples of programmable logic resource technology include programmable logic devices (PLDs) and field programmable gate arrays (FPGAs).

To facilitate the use of programmable logic resources in certain applications, intellectual property (IP) blocks are coupled to programmable logic resource core circuitry. In one application, an IP block is a block of logic or data that supports a multi-channel communications protocol such as high speed serial interface (HSSI) communications. HSSI communications includes industry standards such as, for example, XAUI, InfiniBand, 1G Ethernet, FibreChannel, Serial RapidIO, and 10G Ethernet. In a multi-channel communications protocol, data transfers to and from the programmable logic resource core circuitry and the IP block over multiple channels. For example, for the 10GBASE-X standard, which has a throughput of ten Gigabits per second, the IP block has four channels that each supports data transfers of up to 2.5 Gigabits per second.

In a typical application, the programmable logic resource core circuitry sends a forwarded clock and data signals aligned with the forwarded clock to the channels in the IP block. A problem that often arises with the routing of the forwarded clock and the data signals is that the signals arrive at their respective channel at different times. This can be caused by the varying distances from the signal source in the programmable logic resource core circuitry to each channel in the IP block and also due to varying temperature changes.

The distance from the signal source in the programmable logic resource core circuitry to each channel in the IP block varies with each channel. The greater the distance, the longer the wire length and the more time that is needed to route a signal to a given channel. To minimize the difference in arrival times of the signals to each channel, additional wiring is typically added to the routing so that the wire lengths are substantially the same for each channel. However, the use of additional wiring increases the routing area. Furthermore, this approach does not take into account dynamic factors that can also cause delays in the routing of signals to the channels.

Signals can also reach their respective channel at different times due to varying temperature changes. Heat dissipation can vary with each channel depending on the application that the signals are used for and the location of the signal routing to each channel on the programmable logic resource. The greater the heat dissipation, the longer it takes for a signal to reach a given channel. To minimize heat dissipation, fans are sometimes installed to cool down a system. However, the fans may not produce the same cooling effect on the different areas of the programmable logic resource. Moreover, fans may not even be provided in a system.

In view of the foregoing, it would be desirable to provide circuitry that aligns data signals to a phase of a forwarded clock at each channel in a multi-channel communications protocol.

SUMMARY OF THE INVENTION

In accordance with the invention, circuitry is provided that aligns data signals to a phase of a forwarded clock at each channel in a multi-channel communications protocol. A dynamic phase alignment circuit can be provided on an intellectual property (IP) block on a programmable logic resource. The IP block can be a soft IP block where the circuit is programmed in as programmable logic, a hard IP block where the circuit is custom-designed in hardware, or a combination of the same (e.g., a firm IP block). Although the invention is described herein primarily in the context of a dynamic phase alignment circuit provided on a programmable logic resource for clarity and specificity, the circuit can be provided on any suitable device such as, for example, an application-specific standard product (ASSP), an application-specific integrated circuit (ASIC), a full-custom chip, or a dedicated chip.

Programmable logic resource core circuitry sends a forwarded clock and data signals to the IP block. The forwarded clock is sent to a phase locked loop (PLL) circuit that generates multiple clock phases of the forwarded clock. The multiple clock phases and the data signals are then sent to a dynamic phase alignment circuit associated with each channel in the multi-channel communications protocol. Each dynamic phase alignment circuit selects the optimal clock phase in which to align a data signal for transmission to the corresponding channel.

In one embodiment, the dynamic phase alignment circuit can further be used for clock recovery. When used for clock recovery, the clock signal is embedded in the data signal to generate a clock data recovery (CDR) data signal. A reference clock, which has a frequency with a known relationship to the frequency of the CDR data signal, is used to recover the embedded clock signal and the data signal from the CDR data signal. The reference clock is sent to the PLL circuit where the known frequency relationship is used to generate multiple clock phases having a frequency that closely matches the frequency of the reference clock. The multiple clock phases and the CDR data signal are sent to the dynamic phase alignment circuit associated with each channel in the multi-channel communications protocol. Each dynamic phase alignment circuit selects the optimal clock phase as the recovered clock, which is used to recover the embedded clock signal and the data signal from the CDR data signal for transmission to the corresponding channel.

The invention dynamically compensates for different channel delay relative to the clock, which improves reliability of high speed interfaces. In addition, the invention allows for the circuitry to perform clock recovery.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
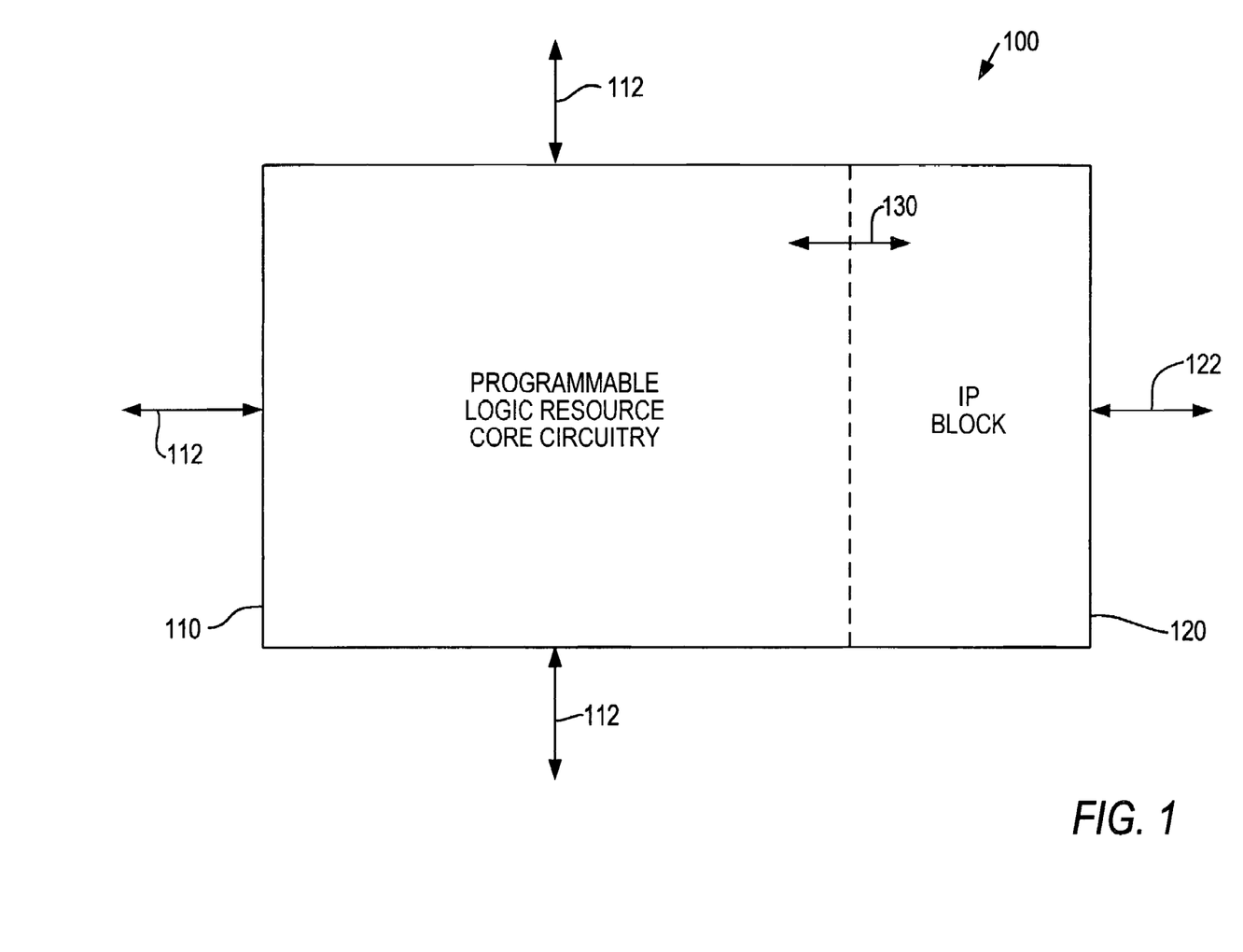
FIG. 1 is a simplified block diagram of an illustrative embodiment of a programmable logic resource.

An illustrative programmable logic resource 100 constructed in accordance with the invention is shown in FIG. 1. Programmable logic resource 100 is an integrated circuit that includes programmable logic resource core circuitry 110 and an intellectual property (IP) block 120. Programmable logic resource core circuitry 110 can be typical programmable logic circuitry of any of several known types and constructions. IP block 120 can be a soft IP block in which circuitry is programmed in as programmable logic. Circuitry is described in terms of gates and interconnections for the gates using a netlist or a hardware description language (e.g., Very High Speed Integrated Circuit Hardware Description Language (VHDL) or Verilog), which can be synthesized with the surrounding logic. In another embodiment, IP block 120 can be a hard IP block in which circuitry is custom-designed in hardware. In yet another embodiment, IP block 120 can be a firm IP block in which circuitry is partly designed in hardware but is configurable for various applications.

Although the invention is described herein primarily in the context of a dynamic phase alignment circuit provided on a programmable logic resource for clarity, the circuit can be provided on any suitable device such as, for example, an application-specific standard product (ASSP), an application-specific integrated circuit (ASIC), a full-custom chip, or a dedicated chip.

In accordance with the invention, IP block 120 is configured to support, for example, a multi-channel communications protocol such as high speed serial interface ("HSSI") circuitry. The HSSI circuitry is used to receive one or more high speed serial ("HSS") signals via connection(s) 122 and to pass the information thus received on to programmable logic resource core circuitry 110 in a form that is more readily usable by the core circuitry. Alternatively or additionally, IP block 120 may be used to output via connection (s) 122 one or more signals indicative of information received from programmable logic resource core circuitry 110. Leads 130 are used to convey signals between programmable logic resource core circuitry 110 and IP block 120. Programmable logic resource core circuitry 110 may also input and/or output other, typically non-IP block, signals via leads 112.

Programmable logic resource core circuitry sends to the IP block a forwarded clock and data signals. The forwarded clock is sent to a phase locked loop (PLL) circuit that generates multiple clock phases of the forwarded clock. The PLL circuit can be a digital phase locked loop (DPLL), an enhanced phase locked loop (EPLL), or any other suitable type of PLL circuit. The data signals can be transmitted serially, in parallel, or a combination of the same. For clarity, the data signals are primarily described herein as being transmitted serially. The multiple clock phases and the data signals are sent to a dynamic phase alignment circuit associated with each channel in the multi-channel communications protocol. Each data signal can be sent to the dynamic phase alignment circuit as a differential signal or as a single-ended signal. Each dynamic phase alignment circuit selects the optimal clock phase with which to align the data signal for transmission to the corresponding channel.

In one embodiment, the same forwarded clock is used to align the data signals for each channel. In another embodiment, different forwarded clocks can be used to align the data signals for each channel. For clarity, the invention is described primarily in the context of using the same forwarded clock for each channel.

The dynamic phase alignment circuit associated with each channel includes the following: a multi-phase sampling serializer-deserializer block, a PLL circuit, an active alignment selector block, and a multiplexer block. A data signal and the multiple clock phases of the forwarded clock are input to the multi-phase sampling serializer-deserializer block. The multi-phase sampling serializer-deserializer block samples the data signal at each of the multiple clock phases, aligns each sampled data signal to one of the clock phases, and deserializes each sampled data signal to generate an aligned byte associated with each of the multiple clock phases. The usual definition of a byte is eight bits, but as used herein "byte" can refer to any plural number of bits such as eight bits, nine bits, ten bits, eleven bits, or fewer or more than these number of bits.

The PLL circuit takes as input the clock phase from which each sampled data signal is to be aligned and divides the clock phase in order to allow the sampled data signals to be deserialized to generate the aligned bytes.

The aligned bytes associated with each of the multiple clock phases is sent as input to the active alignment selector block which determines which of the multiple clock phases is to be used to align the data signals for output to a corresponding channel. In one embodiment, bits in the same bit location for each of the aligned bytes (e.g., bit 0 from each of the aligned bytes, bit 1 from each of the aligned bytes, etc.) are grouped together and sent as input to a multiplexer block. The multiplexer block selects the group of bits from one of the bit locations as output. In another embodiment, instead of using a multiplexer block, the bits from a selected bit location for each of the aligned bytes are used. From the selected group of bits, the bits associated with adjacent clock phases are compared to determine a mismatch which indicates an edge of the signal.

A lookup table is then used to determine whether the clock phase should remain the same or should change to a more optimal clock phase. If there is no mismatch, the clock phase remains the same and the lookup table returns select signals corresponding to the previous clock phase. If there is a mismatch, the lookup table selects a more optimal clock phase based on the indicated edge of the signal. In one embodiment, the lookup table will return select signals corresponding to a clock phase that is adjacent in phase to the immediately preceding clock phase and that is one clock phase closer to the optimal clock phase. The select signals are fed back into the lookup table to generate new select signals until the select signals corresponding to the optimal clock phase are generated. In this embodiment, the clock phase changes by adjacent clock phases. In another embodiment, the lookup table can be designed to immediately output select signals corresponding to the optimal clock phase. Because there may be glitches in the signals, providing a lookup table that selects clock phases that are adjacent in phase to an immediately preceding clock phase rather than jumping over multiple clock phases to the optimal clock phase prevents inadvertent changes in the output.

The select signals generated by the active alignment selector block are sent as select signals to a multiplexer block whose inputs are the aligned bytes associated with each of the multiple clock phases. The aligned data signals at the selected clock phase are output to the corresponding channel.

In addition, the dynamic phase alignment circuit can further be used for clock recovery. In a clock recovery circuit, the clock signal is embedded in the data signal to generate a clock data recovery (CDR) data signal. A reference clock, which has a known frequency relationship to the frequency of the CDR data signal, is used to recover the embedded clock signal and the data signal from the CDR data signal for transmission to the corresponding channel.

Figure 2:
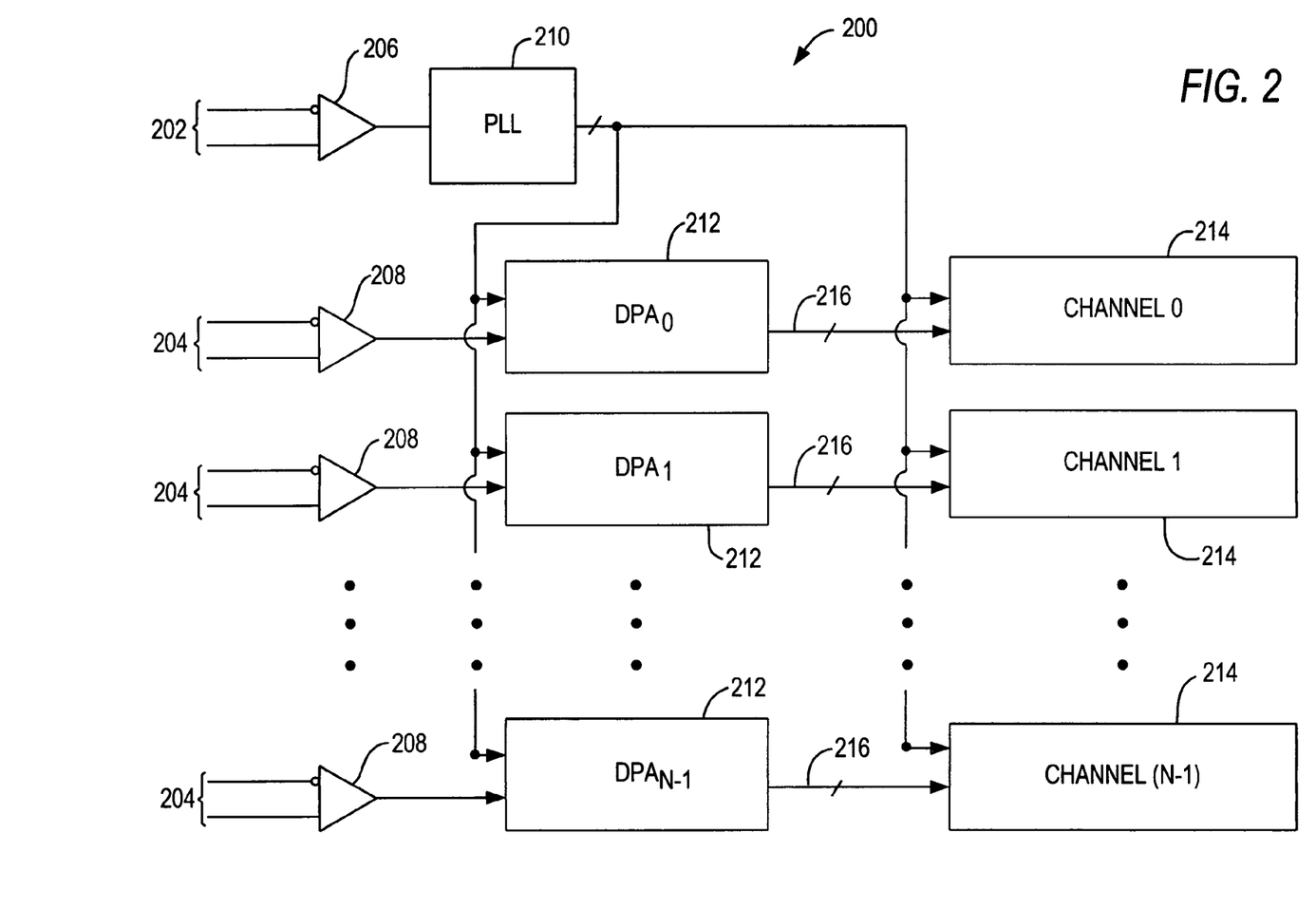
FIG. 2 is simplified block diagram of an illustrative embodiment of a dynamic phase alignment circuit in accordance with the invention.

FIG. 2 illustrates circuitry 200 having dynamic phase alignment. Circuitry 200 can be in IP block 120 which may be part of programmable logic resource 100, on an ASSP, ASIC, full-custom chip, dedicated chip, or other suitable device. Circuitry 200 receives differential signal pairs 202 and 204 from any suitable source. For example, signal pairs 202 and 204 can be signals 130 from programmable logic resource core circuitry 110, signals 122 from circuitry external to programmable logic resource 100, or signals from any other suitable source. Signal pairs 202 and 204 can be routed via a backplane, cables, over a printed circuit board, or any other suitable path. Signal pair 202 can be a forwarded clock. Signal pairs 204 can be input data signals. Signal pairs 202 and 204 are applied to conventional differential signaling drivers 206 and 208, respectively, to convert the signals back to a single-ended signal. Although the input signals are described herein primarily in the context of differential signal pairs 202 and 204 for clarity, circuitry 200 can receive as input single-ended signals from any suitable source.

The output of driver 206 is input to a PLL circuit 210. PLL circuit 210 receives as input the forwarded clock and outputs a number of clocks having the same period as the forwarded clock but different phases that are equally spaced apart. PLL circuit 210 can be a digital PLL, an enhanced PLL, or another suitable type of PLL. In one embodiment, the clocks sample within an input bit and are aligned to the edges of an input data bit (e.g., input data bits may be part of signal 302). For example, PLL circuit 210 can output eight clocks (of which one of the clocks is the same as the forwarded clock) that are 22.5° apart in phase from one another. The initial condition of the input data bit needs to be known in order for the clock samples to detect the edges of the input data bit.

In another embodiment, the clocks overlap the edges of an input data bit. For example, PLL circuit 210 can output seven clocks that sample within an input data bit and an eighth clock that samples into a next input data bit. The eight clocks are 25.7° apart in phase from one another. Additional clocks can be generated that sample into the neighboring input data bits. By generating clocks that overlap the edges, the likelihood of detecting the edges of an input data bit are increased, particularly when the initial condition of the input data bit is not known.

In both embodiments, the number of clocks generated can be any suitable number. The more clocks that are generated, the smaller the phase difference between clocks and thus the better the resolution. The clocks can sample at a double data rate (DDR) (i.e., at a rising edge and a falling edge) or at a single data rate (i.e., at a rising edge or at a falling edge).

The output of each driver 208 is input to a dynamic phase alignment circuit 212. Each circuit 212 takes as input data 204 from programmable logic resource core circuitry 110 or other suitable device and outputs data 216 to a respective channel 214 in IP block 120. Each circuit 212 uses the output clocks generated from PLL circuit 210 to select the optimal clock with which to output the data 216 to a respective channel 214. Each circuit 212 dynamically selects the optimal clock for sending its data to the respective channel 214.

Figure 3:
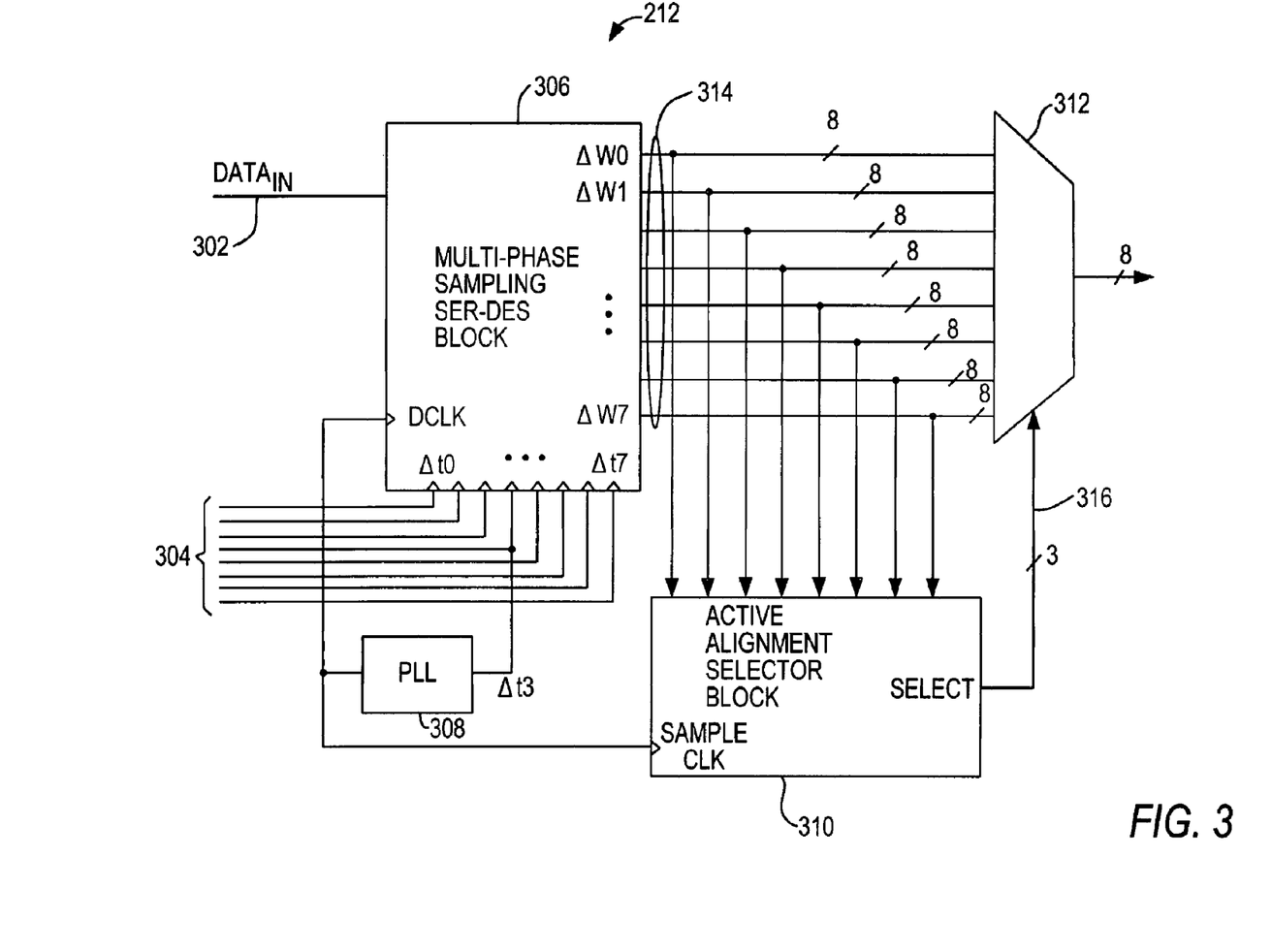
FIG. 3 is a more detailed, but still simplified, block diagram of an illustrative embodiment of the dynamic phase alignment circuit shown in FIG. 2 in accordance with the invention.

FIG. 3 is a more detailed diagram of one dynamic phase alignment circuit 212 as shown in FIG. 2. Circuit 212 includes a multi-phase sampling serializer-deserializer block 306, a PLL circuit 308, an active alignment selector block 310, and a multiplexer block 312. PLL circuit 308 receives as input one of the clock phases 304 (e.g., $\Delta t0$-$\Delta t7$) generated from PLL circuit 210. For clarity, the invention is described herein primarily in the context of PLL circuit 210 generating eight clocks phases 304 based on the forwarded clock, although PLL circuit 210 can generate any suitable number of clocks phases.

Figure 4A:
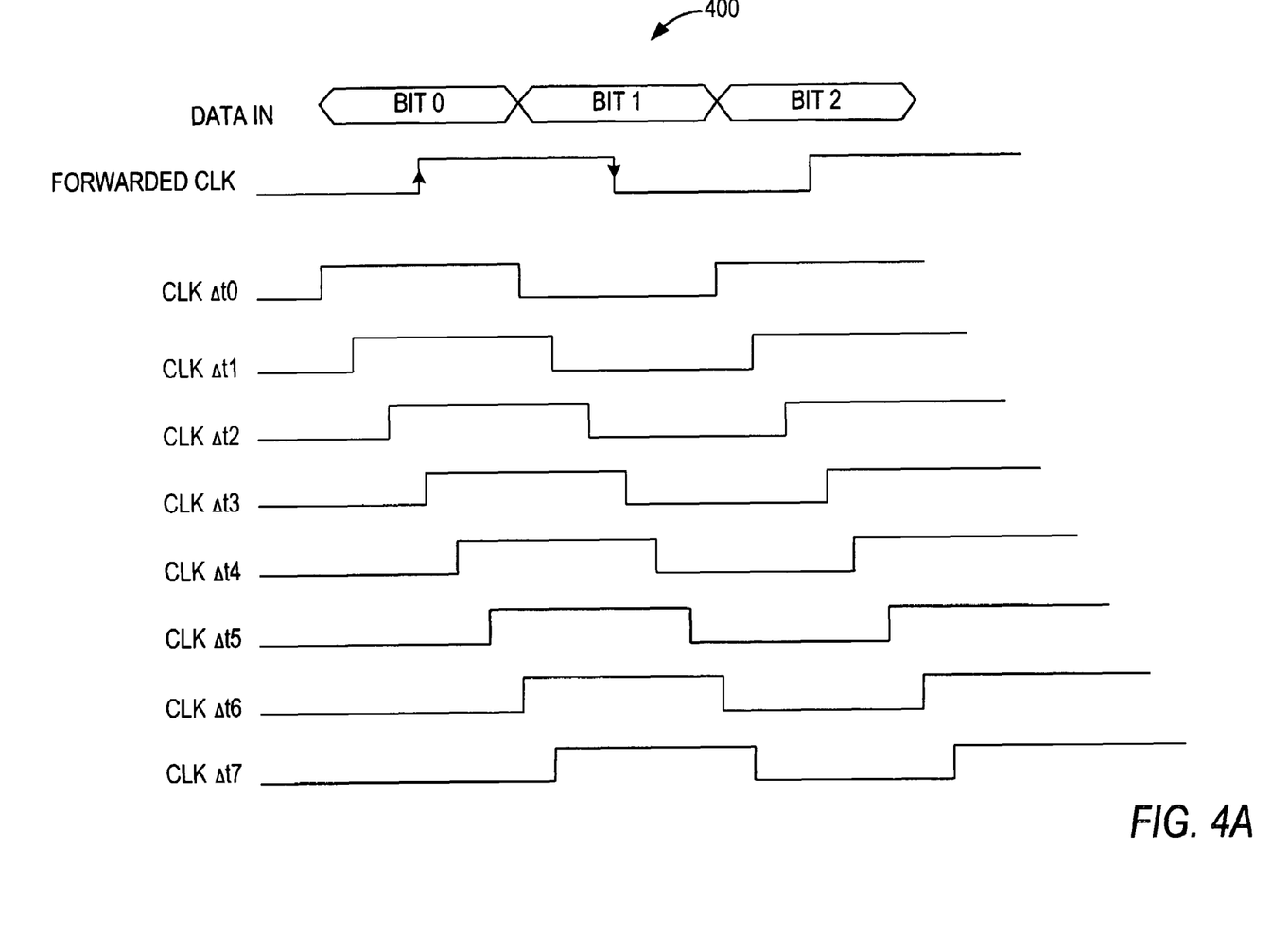
FIGS. 4A-B are timing diagrams of clock phases in accordance with different illustrative embodiments of the invention.
Figure 4B:
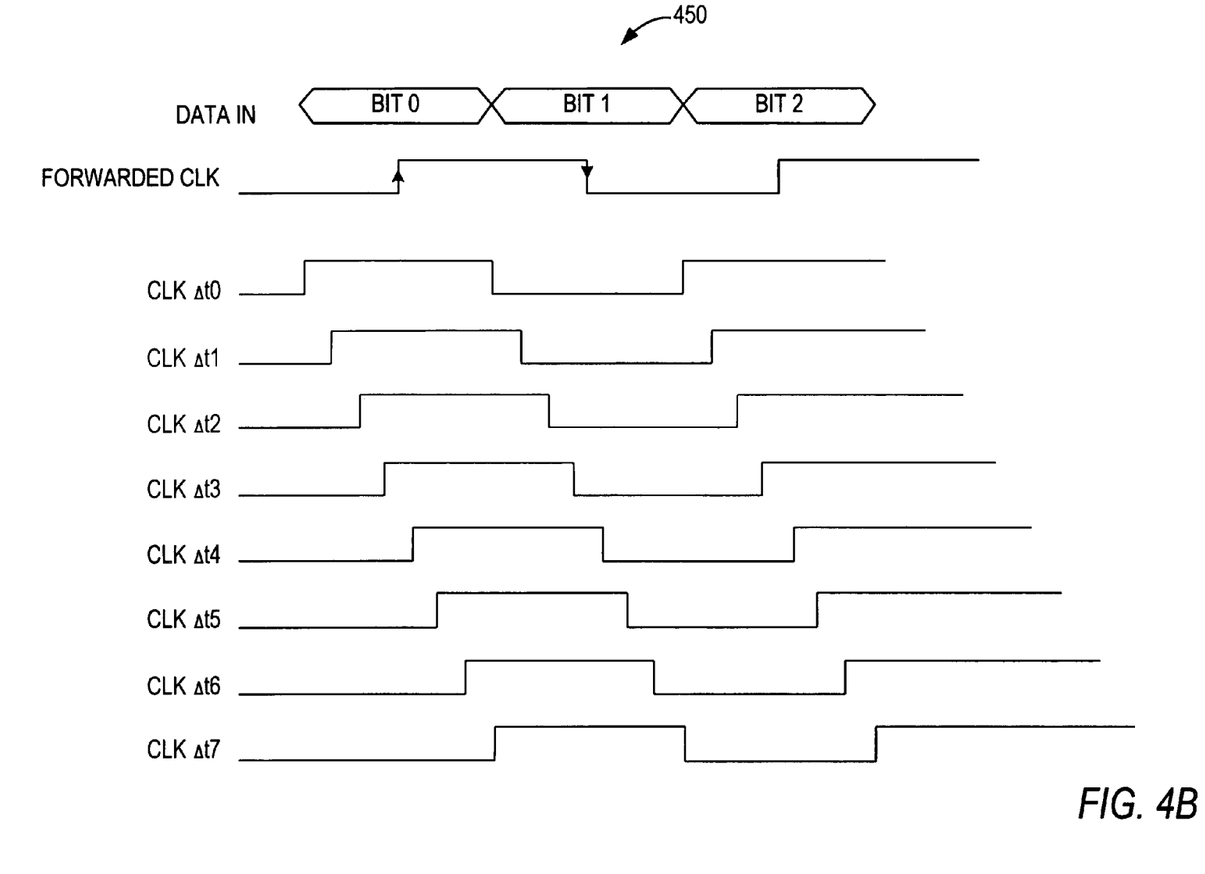

Referring now to FIGS. 4A-B, timing diagrams 400 and 450, respectively, illustrate the different clock phases 304 that can be generated from PLL circuit 210 in different embodiments of the invention. Input data ($DATA_{IN}$) is sent serially to circuit 212 one bit each clock cycle. Alternatively, input data can be sent in parallel to circuit 212 a number of bits each clock cycle. A forwarded clock is input to PLL circuit 210. In one embodiment, as shown in FIG. 4A, PLL circuit 210 generates eight clock phases (e.g., CLK $\Delta t0$-CLK $\Delta t7$) that have the same period as the forwarded clock, are equally spaced apart in phase, and which overlap the edges of the input bit (e.g., CLK $\Delta t0$-CLK $\Delta t6$ are within input data bit 0 and CLK $\Delta t7$ overlaps into input data bit 1). In another embodiment, as shown in FIG. 4B, PLL circuit 210 generates eight clock phases (e.g., CLK $\Delta t0$-CLK $\Delta t7$) that have the same period as the forwarded clock, are equally spaced apart in phase, and which align to the edges of the input bit (e.g., CLK $\Delta t0$-CLK $\Delta t7$ are within input data bit 0). Clock phase $\Delta t3$ has the same phase as the forwarded clock.

Referring back to FIG. 3, any clock from clock phases 304 can be used as input to PLL circuit 308. For clarity, the invention is described herein primarily in the context of PLL circuit 308 receiving as input clock phase $\Delta t3$, although PLL circuit 308 can receive any other suitable clock phase (e.g., $\Delta t0$, $\Delta t1$, $\Delta t2$, $\Delta t4$, $\Delta t5$, $\Delta t6$, $\Delta t7$). PLL circuit 308 can function as a clock divider to generate an output clock (DCLK) having a longer period than the input clock. For clarity, the invention is described herein primarily in the context of PLL circuit 308 dividing the input clock by four for purposes of byte alignment when a byte is eight bits, although PLL circuit 308 can function as any other suitable clock divider.

Block 306 receives input data 302 (e.g., from driver 208), and clocks phases 304 (e.g., from PLL circuit 210). Block 306 samples a number of bits from the input data 302 at each of clock phases 304, aligns each sampled data to one of the clock phases 304, and deserializes each sampled data to generate an aligned byte (e.g., $\Delta W0$-$\Delta W7$) 314 associated with each of the clock phases 304.

Figure 5:
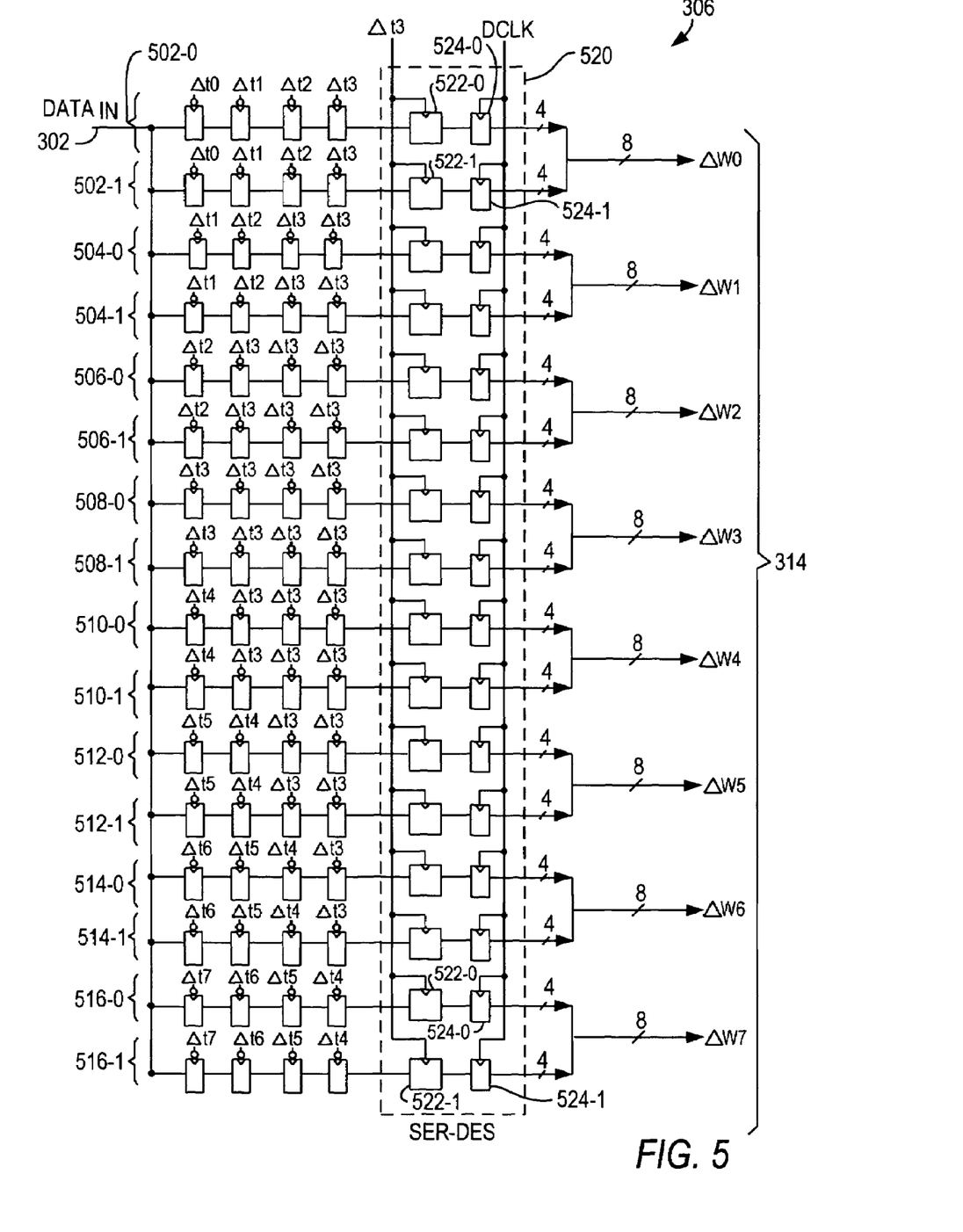
FIG. 5 is a schematic diagram of an illustrative embodiment of a multi-phase sampling serializer-deserializer block shown in FIG. 3 in accordance with the invention.

FIG. 5 illustrates in more detail multi-phase sampling serializer-deserializer block 306 as shown in FIG. 3. Block 306 includes sets of flip-flops clocked by one or more of clock phases 304 and the respective complement(s) 502, 504, 506, 508, 510, 512, 514, and 516 and a serializer-deserializer block 520. (The set of flip-flops clocked by one or more of clock phases 304, which can be used to sample the data at a rising edge of the clock, is designated by a "–0" next to the reference numeral. The set of flip-flops clocked by the respective complement(s), which can be used to sample the data at a falling edge of the clock, is designated by a "–1" next to the reference numeral.) Although block 306 is described herein primarily in the context of clock phases 304 sampling at a double data rate (DDR) (i.e., at a rising edge and a falling edge) for clarity, block 306 can have clock phases 304 sample at a single data rate (i.e., at a rising edge or at a falling edge) or using any other suitable sampling technique.

Each set of flip-flops 502, 504, 506, 508, 510, 512, 514, and 516 receives input data ($DATA_{IN}$) 302 that is clocked at one of clock phases (e.g., $\Delta t0$-$\Delta t7$) 304 and its complement (e.g., $\Delta t0'$-$\Delta t7'$). Each set of flip-flops 502, 504, 506, 508, 510, 512, 514, and 516 includes a number of flip-flops needed for all the set of flip-flops to become aligned to a selected clock phase. For example, as shown in FIG. 5, each set of flip-flops 502, 504, 506, 508, 510, 512, 514, and 516 includes four flip-flops that are used to align the input data to selected clock phase $\Delta t3$ (and its complement). For clarity, the invention is described herein primarily in the context of aligning the input data to selected clock phase $\Delta t3$ (and its complement), although the input data can be selected to align to any other suitable clock phase (e.g., $\Delta t0$, $\Delta t1$, $\Delta t2$, $\Delta t4$, $\Delta t5$, $\Delta t6$, $\Delta t7$).

Beginning at the first flip-flop in each set which is clocked by one of clock phases 304 (and its complement), each successive flip-flop is clocked by a next adjacent clock phase 304 (and its complement) until the selected clock phase $\Delta t3$ (and its complement) is reached. For example, for set of flip-flops 502-0, each input data bit 302 is sent to a first flip-flop clocked by clock phase $\Delta t0$, then to a second flip-flop clocked by clock phase $\Delta t1$, then to a third flip-flop clocked by clock phase $\Delta t2$, and then to a fourth flip-flop clocked by clock phase $\Delta t3$. For set of flip-flops 504-0, each input data bit 302 is sent to a first flip-flop clocked by clock phase $\Delta t1$, then to a second flip-flop clocked by clock phase $\Delta t2$, then to a third flip-flop clocked by clock phase $\Delta t3$, and then to a fourth flip-flop also clocked by clock phase $\Delta t3$.

The output of the fourth flip-flop from each set of flip-flops 502, 504, 506, 508, 510, 512, 514, and 516 is sent to serializer-deserializer block 520. Block 520 includes sets of two flip-flops 522 and 524. Each flip-flop 522 receives as input an output from the corresponding sets of flip-flops 502, 504, 506, 508, 510, 512, 514, and 516 and is clocked by the selected clock phase $\Delta t3$. The output of each flip-flop 522 is sent as input to a second flip-flop 524 that is clocked by DCLK (e.g., $\Delta t3/4$, the output clock from PLL circuit 308). Multiple bits (e.g., four) of data are stored in each flip-flop 524 before the data is clocked out and combined (e.g., data from pairs of flip-flops 524-0 and 524-1) to produce data 314 that is byte aligned (e.g., $\Delta W0$-$\Delta W7$) and associated with each of the clock phases 304.

Figure 6:
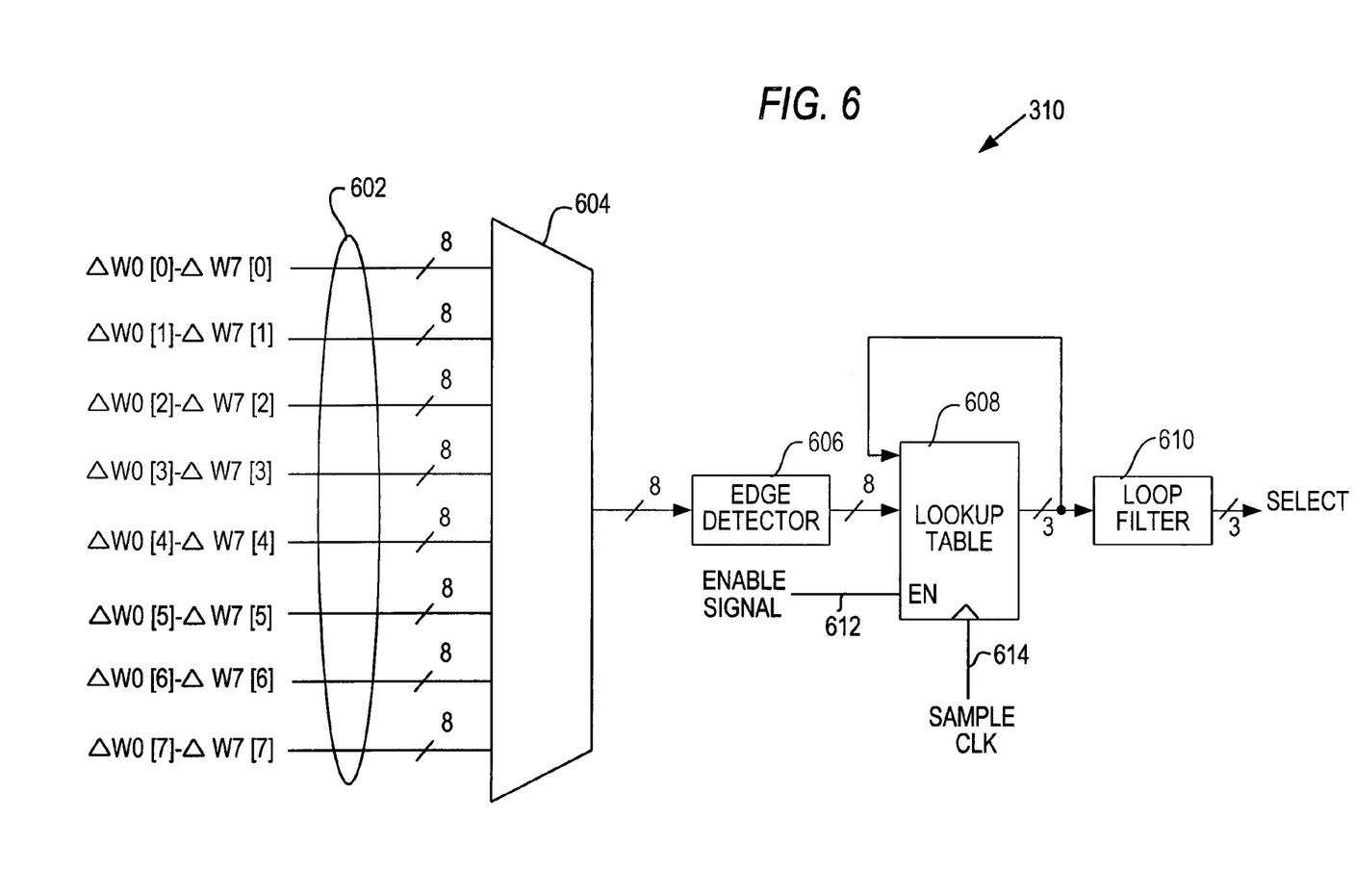
FIG. 6 is a schematic diagram of an illustrative embodiment of an active alignment selector block shown in FIG. 3 in accordance with the invention.

Referring back to FIG. 3, the byte aligned data 314 is sent as input to blocks 310 and 312. Block 310 samples data 314 and determines which of the clock phases 304 is to be used to align the input data for output to a corresponding channel. FIG. 6 illustrates in more detail active alignment selector block 310 as shown in FIG. 3. Block 310 includes a multiplexer block 604, an edge detector circuit 606, a lookup table 608, and a loop filter 610.

Block 310, which takes as input byte aligned data 314 from block 306, groups bits in the same bit location for each of the aligned bytes (e.g., bit 0 from each of the aligned bytes, bit 1 from each of the aligned bytes, etc.) to send as input to multiplexer 604. Multiplexer 604 selects the group of bits from one of the bit locations as output. For example, the first bit from each data 314 (e.g., $\Delta W0[0]$-$\Delta W7[0]$) is sent as a first input to multiplexer 604. The second bit from each output data 314 (e.g., $\Delta W0[1]$-$\Delta W7[1]$) is sent as a second input to multiplexer 604. Multiplexer 604 selects as output one of the inputs 602 to send to edge detector 606. In another embodiment, instead of using multiplexer 604, the bits from a predetermined bit location for each of the aligned bytes are always sent to edge detector 606. Although not shown, in some embodiments, the output of multiplexer 604, or the bits from the predetermined bit location, may be sent to a synchronization register prior to being sent to edge detector 606. The synchronization register may be controlled by a sample clock 614 (e.g., DCLK or $\Delta t3/4$) to synchronize the input data to a single clock.

Figure 7:
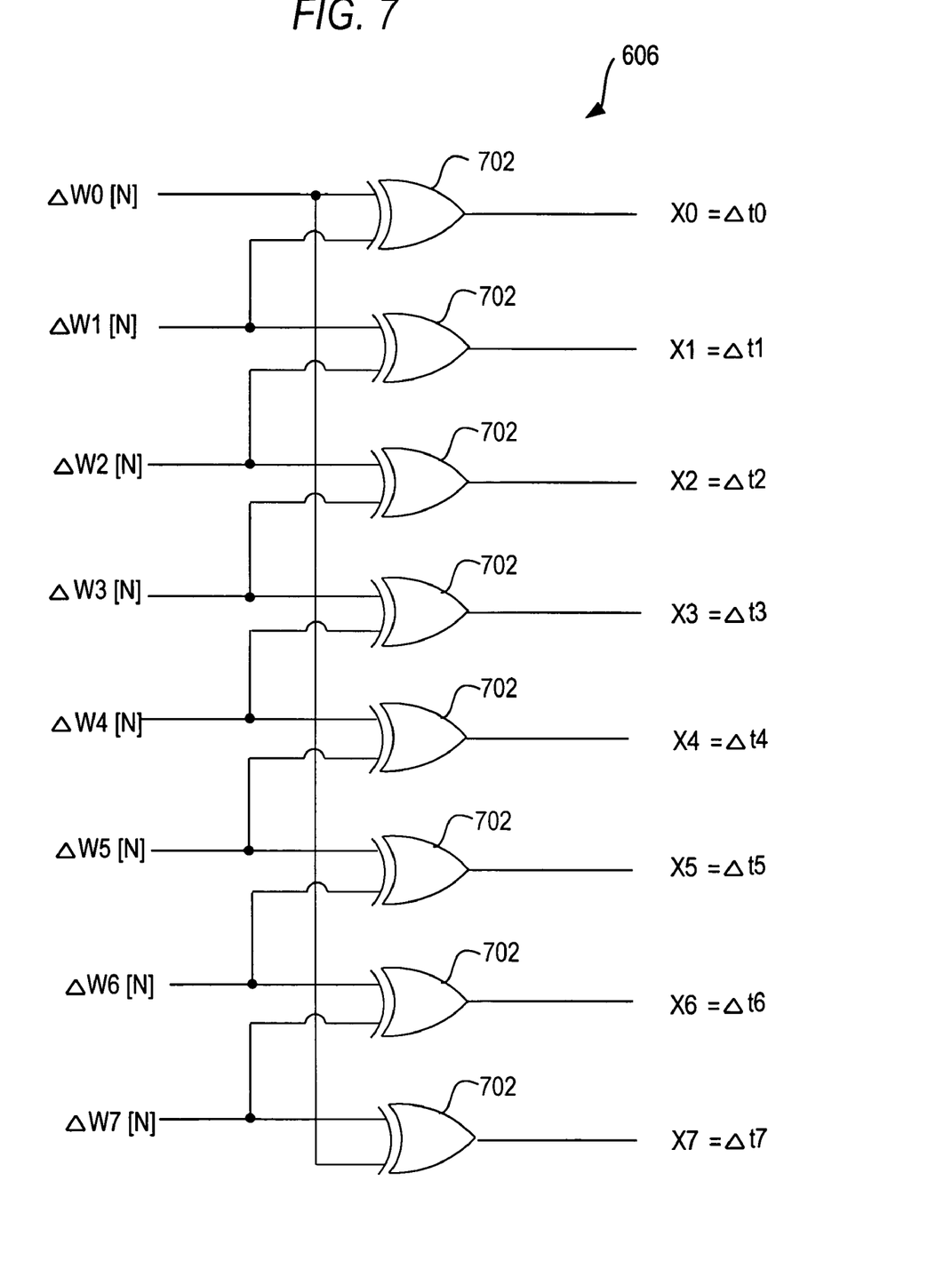
FIG. 7 is a schematic diagram of an illustrative embodiment of an edge detector circuit shown in FIG. 6 in accordance with the invention.

Edge detector 606 determines which bits from certain clock phases are valid and which, if any, are invalid by comparing the bits associated with adjacent clock phases. FIG. 7 illustrates in more detail the edge detector 606 shown in FIG. 6. Edge detector 606 includes XOR gates 702. An XOR gate 702 outputs a binary one when there are an odd number of inputs whose value is a binary "1." For the same bit location (e.g., N, where N=0, 1, . . . , or 7) of each sampled data 314, the bits associated with adjacent clock phases are compared. For example, if bit 0 is selected, the value of bit 0 for sampled data $\Delta W0$ and $\Delta W1$ are sent as input to a first XOR gate 702, the value of bit 0 for sampled data $\Delta W1$ and $\Delta W2$ are sent as input to a second XOR gate 702, the value of bit 0 for sampled data $\Delta W2$ and $\Delta W3$ are sent as input to a third XOR gate 702, etc. If the input values are not the same (e.g., one input is binary "1" and the other input is binary "0"), the output of XOR gate 702 outputs a binary "1." Each output X0-X7 corresponds to a change in clock phase $\Delta t0$-$\Delta t7$, respectively.

Referring back to FIG. 6, the output of each XOR gate 702 is sent as input to lookup table 608. Table 608 determines the optimal clock phase to which the input data 302 is to be sent as output by selecting from the byte aligned data 314. The edge of a signal is determined from the output of each XOR gate 702. Based on the edge of the signal, table 608 determines whether the clock phase should remain the same or should change to a more optimal clock phase. If there is no mismatch (e.g., each output of XOR gate 702 is binary "0"), the clock phase remains the same and table 608 returns select signals corresponding to the immediately preceding clock phase. If there is a mismatch (e.g., the output of at least one XOR gate 702 is binary "1"), table 608 determines the optimal clock phase based on the indicated edge of the signal. In one embodiment, table 608 will return select signals corresponding to a clock phase that is adjacent in phase to the immediately preceding clock phase and that is one clock phase closer to the optimal clock phase. The select signals are fed back into table 608 to generate new select signals until the select signals corresponding to the optimal clock phase are generated. In another embodiment, table 608 can be designed to immediately jump to the optimal clock phase rather than incrementally moving to adjacent clock phases until the optimal clock phase is selected.

Table 608 also receives as input an enable signal 612 that is set when new byte aligned data 314 is sent as input to block 310 and also receives sample clock 614. Table 608 outputs select signals that represents one of the clock phases and feeds back the select signals to table 608 for further processing to select the optimal clock phase.

Figure 8:
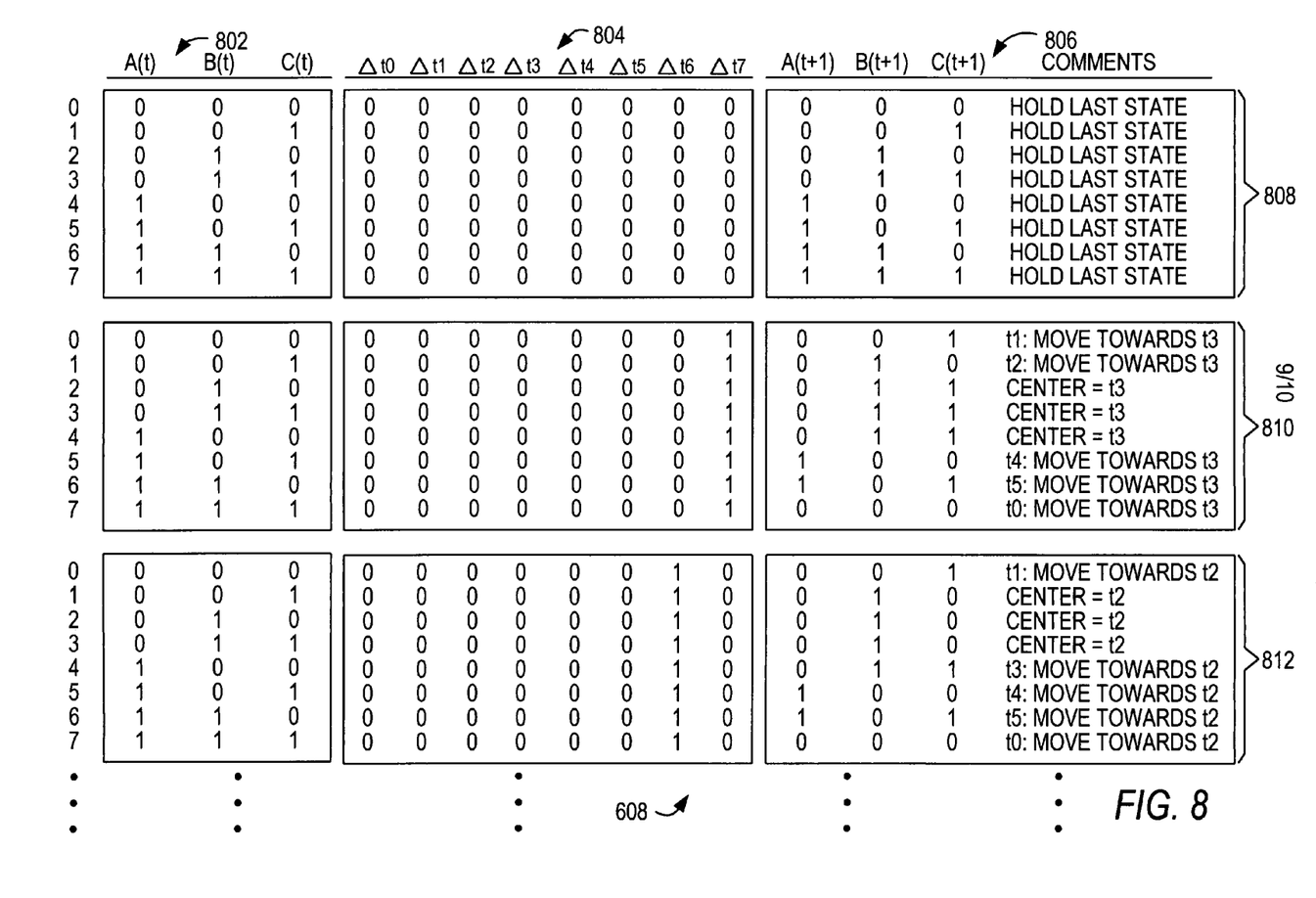
FIG. 8 illustrates in more detail the lookup table shown in FIG. 6 in accordance with one embodiment of the invention.

FIG. 8 is a partial diagram of table 608. Data in column block 802 represents the select signals for the currently selected clock phase. For example, [A(t), B(t), C(t)]=[0,0,0] represents a first clock phase Δt0, [0,0,1] represents a second clock phase Δt1, [0,1,0] represents a third clock phase Δt2, etc. Data in column block 804 represents the outputs from edge detector 606. Although only partially shown, column block 804 represents the different combinations of outputs from edge detector 606. Data in column block 806 represents the select signals for the next clock phase. In row block 808, when all the outputs of edge detector 606 are zero, this indicates that the current clock phase is the optimal clock phase, so the select signals used to select the next clock phase remain the same.

In row block 810, when the output of edge detector 606 for Δt7 is binary "1," this indicates that the edge of a signal is at clock phase Δt7 so the optimal clock phase is Δt3. If the current clock phase is not Δt3, the select signals used to select the current clock phase changes to correspond to a clock phase adjacent to the current clock phase until clock phase Δt3 is selected. For example, if the select signals for the current clock phase are [A(t), B(t), C(t)]=[0,0,0] which represents clock phase Δt0, and if Δt7 is binary "1," the select signals for the next sample clock becomes [0,0,1] to select a next clock phase Δt1. In the next sample clock, the select signals for the clock phase Δt1 are represented by [0,0,1], and the select signals for the following sample clock becomes [0,1,0] to select a next clock phase Δt2. In the third sample clock, the select signals for the clock phase Δt1 are represented by [0,1,0], and the select signals for the fourth sample clock becomes [0,1,1], which corresponds to the optimal clock phase of Δt3.

In row block 812, when the output of edge detector 606 for Δt6 is binary "1," this indicates that the edge of a signal is at clock phase Δt6 so the optimal clock phase is Δt2. If the current clock phase is not Δt2, the select signals used to select the current clock phase are changed. The select signals are changed to correspond to a clock phase adjacent to the current clock phase until clock phase Δt2 is selected. The same pattern applies to the different combinations of output data in column block 804.

Referring back to FIG. 6, the output of table 608 is also sent to a loop filter 610 that lowers the bandwidth of the signals for more stable performance. The output of loop filter 610 is sent as input to multiplexer block 312 to select the aligned byte of data at the selected clock phase for output to the corresponding channel.

In one embodiment, the dynamic phase alignment circuit can further be used for clock recovery. When used for clock recovery, the clock signal is embedded in the data signal to generate a clock data recovery (CDR) data signal (which can be input data signal 302 as shown in FIG. 3). A reference clock (which can be clock 202 as shown in FIG. 2), which has a frequency with a known relationship to the frequency of the CDR data signal, is used to recover the embedded clock signal and the data signal from the CDR data signal. The reference clock is sent to PLL circuit 210 where the known frequency relationship is used to generate multiple clock phases 304 having a frequency that closely matches the frequency of the reference clock. The multiple clock phases and the CDR data signal are sent to a dynamic phase alignment circuit 212 associated with each channel in the multi-channel communications protocol. Each dynamic phase alignment circuit selects the optimal clock phase as the recovered clock, which is used to recover the embedded clock signal and the data signal from the CDR data signal for transmission to the corresponding channel.

Dynamic phase alignment circuit 212 advantageously provides for input data to be dynamically aligned to an optimal clock phase based on a forwarded clock. Regardless of varying wire length of the signals to each channel 214 and varying temperature changes, circuit 212 takes into account these factors to provide dynamic phase alignment. In addition, circuit 212 provides for clock recovery in devices that may otherwise not have separate circuitry for clock recovery.

Figure 9:
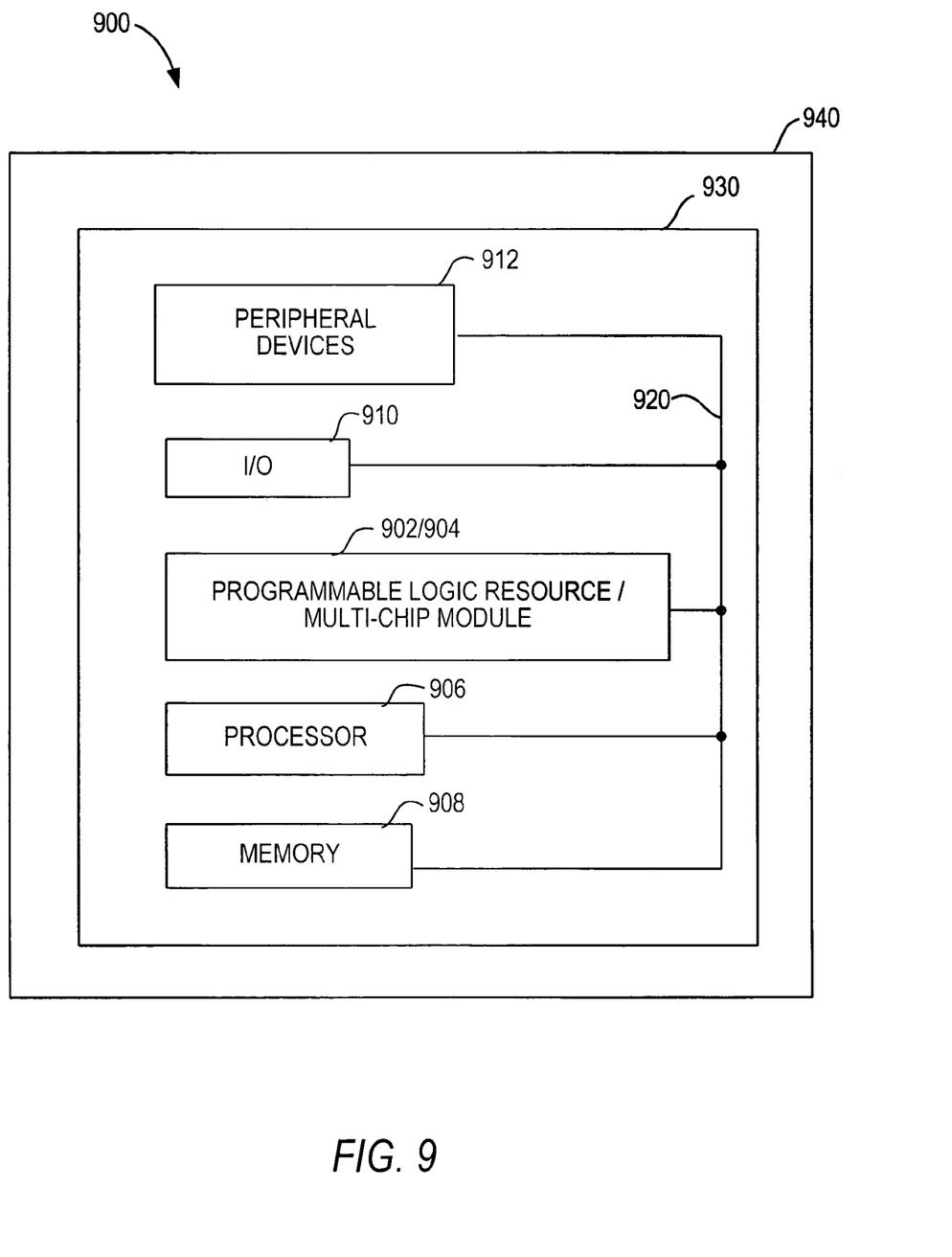
FIG. 9 is a simplified schematic block diagram of an illustrative system employing a programmable logic resource, multi-chip module, or other suitable device in accordance with the invention.

FIG. 9 illustrates a programmable logic resource 902, multi-chip module 904, or other device (e.g., ASSP, ASIC, full-custom chip, dedicated chip). which includes embodiments of this invention in a data processing system 900. Data processing system 900 can include one or more of the following components: a processor 906, memory 908, I/O circuitry 910, and peripheral devices 912. These components are coupled together by a system bus or other interconnections 920 and are populated on a circuit board 930 which is contained in an end-user system 940.

System 900 can be used in a wide variety of applications, such as computer networking, data networking, instrumentation, video processing, digital signal processing, or any other application where the advantage of using programmable or reprogrammable logic is desirable. Programmable logic resource/module 902/904 can be used to perform a variety of different logic functions. For example, programmable logic resource/module 902/904 can be configured as a processor or controller that works in cooperation with processor 906. Programmable logic resource/module 902/904 may also be used as an arbiter for arbitrating access to a shared resource in system 900. In yet another example, programmable logic resource/module 902/904 can be configured as an interface between processor 906 and one of the other components in system 900. It should be noted that system 900 is only exemplary, and that the true scope and spirit of the invention should be indicated by the following claims.

Various technologies can be used to implement programmable logic resources 902 or multi-chip modules 904 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

Thus it is seen that circuitry is provided that aligns data signals to a phase of a forwarded clock at each channel in a multi-channel communications protocol and which also provides for clock recovery. One skilled in the art will appreciate that the invention can be practiced by other than the prescribed embodiments, which are presented for purposes of illustration and not of limitation, and the invention is limited only by the claims which follow.

What is claimed is:

1. An apparatus that provides dynamic phase alignment for a multi-channel communications protocol comprising:
   a phase-locked loop circuit that receives as input a clock and is operative to generate a plurality of clock phases;
   a dynamic phase alignment circuit associated with a channel in the multi-channel communications protocol that receives as input a data signal and the plurality of clock phases, wherein the dynamic phase alignment circuit is operative to select a clock phase from the plurality of clock phases from which to align the data signal for output to the channel, wherein the dynamic phase alignment circuit further comprises a multi-phase sampling serializer-deserializer circuit operative to:
   sample the data signal at each of the plurality of clock phases;
   align the data signal at each of the plurality of clock phases to one of the plurality of clock phases; and
   deserialize the data signal to form an aligned byte of data associated with each of the plurality of clock phases.

2. The apparatus of claim 1 wherein the plurality of clock phases has a same period as the period of the clock and is equally spaced apart in phase.

3. The apparatus of claim 1 further comprising an active alignment selector circuit coupled to the output of the multi-phase sampling serializer-deserializer circuit and operative to select one of the plurality of clock phases.

4. The apparatus of claim 3 wherein the active alignment selector circuit is operative to select a same clock phase as a previously selected clock phase.

5. The apparatus of claim 3 wherein the active alignment selector circuit is operative to select a clock phase that is adjacent in phase to a previously selected clock phase.

6. The apparatus of claim 3 wherein the active alignment selector circuit is operative to select a clock phase that is non-adjacent in phase to a previously selected clock phase.

7. The apparatus of claim 3 wherein the active alignment selector circuit further comprises:
   an edge detector circuit that accepts as input a bit value in a same bit location for each aligned byte of data and is operative to indicate a difference between bit values associated with adjacent clock phases; and
   a lookup table that accepts as input the output of the edge detector and the output of the lookup table, wherein the lookup table is operative to output select signals corresponding to one of the plurality of clock phases.

8. The apparatus of claim 7 wherein the edge detector circuit further comprises a plurality of XOR gates, wherein each of the plurality of XOR gates receives as input two bit values associated with adjacent clock phases.

9. The apparatus of claim 7 wherein the active alignment selector circuit further comprises a filter that accepts as input the select signals from the lookup table.

10. The apparatus of claim 3 further comprising a multiplexer coupled to the output of the multi-phase sampling serializer-deserializer circuit and the active alignment selector circuit, wherein the multiplexer is operative to select the aligned byte associated with the selected one of the plurality of clock phases.

11. The apparatus of claim 1 wherein the dynamic phase alignment circuit is further operative to perform clock recovery and wherein the data signal received as input a clock embedded in the data signals.

12. The apparatus of claim 1 wherein the apparatus is a programmable logic resource.

13. The apparatus of claim 1 wherein the apparatus is an application-specific standard product.

14. The apparatus of claim 1 wherein the apparatus is an application-specific integrated circuit.

15. A programmable logic resource comprising:
   programmable logic resource core circuitry;
   an intellectual property block that supports a multi-channel communications protocol and is coupled to the programmable logic resource core circuitry, wherein the intellectual property block comprises:
   circuitry that accepts as input a clock and data signals from the programmable logic resource core circuitry and selects a phase of the clock from which to align the data signals for output to each channel in the intellectual property block;
   a phase-locked loop circuit that receives as input the clock and is operative to generate a plurality of clock phases; and
   a dynamic phase alignment circuit associated with each channel in the intellectual property block that receives as input respective data signals and the plurality of clock phases, wherein each dynamic phase alignment circuit is operative to select a clock phase from the plurality of clock phases from which to align the respective data signals for output to each channel.

16. A digital processing system comprising:
   processing circuitry;
   a memory coupled to the processing circuitry; and
   the programmable logic resource as defined in claim 15 coupled to the processing circuitry and the memory.

17. A circuit board on which is mounted the programmable logic resource as defined in claim 15.

18. The circuit board defined in claim 17 further comprising:
   a memory mounted on the circuit board and coupled to the programmable logic resource.

19. The circuit board defined in claim 17 further comprising:
   processing circuitry mounted on the circuit board and coupled to the programmable logic resource.

20. A method for providing dynamic phase alignment for a multi-channel communications protocol comprising:
   receiving as input a clock and generating a plurality of clock phases based on the clock;
   sampling input data at each of the plurality of clock phases, comprising:
   aligning the input data at each of the plurality of clock phases to one of the plurality of clock phases, and
   deserializing the input data at each of the plurality of clock phases to generate an aligned byte of data associated with each of the plurality of clock phases;
   determining which one of the plurality of clock phases from which to align the input data for output to a channel in the multi-channel communications protocol; and
   sending the input data sampled at the determined one of the plurality of clock phases as output to the channel.

21. The method of claim 20 wherein the determining further comprises:
  selecting a bit value in a same bit location for each aligned byte of data;
  comparing pairs of bit values associated with adjacent clock phases; and
  for each pair of bit values associated with adjacent clock phases:
    sending a first output when the bit values are different, and
    sending a second output when the bit values are the same.

22. The method of claim 21 further comprising determining an optimal clock phase from the plurality of clock phases based on the output for each pair of bit values.

23. The method of claim 22 wherein the determined one of the plurality of clock phases is the optimal clock phase.

24. The method of claim 22 wherein the determined one of the plurality of clock phases is a clock phase that is immediately adjacent in phase to a previously selected clock phase and that is one phase closer to the optimal clock phase.

* * * * *